(12) United States Patent
Lin et al.

(10) Patent No.: US 9,327,231 B2
(45) Date of Patent: May 3, 2016

(54) TUBULAR CERAMIC-CARBONATE DUAL-PHASE MEMBRANES AND METHODS OF MANUFACTURE THEREOF

(71) Applicant: Arizona Board of Regents on behalf of Arizona State University, Tempe, AZ (US)

(72) Inventors: Jerry Y. S. Lin, Scottsdale, AZ (US); Jose Ortiz-Landeros, Tempe, AZ (US); Xue-Liang Dong, Tempe, AZ (US)

(73) Assignee: Arizona Board of Regents on behalf of Arizona State University, Tempe, AZ (US)

( * ) Notice: Subject to any disclaimer, the term of this patent is extended or adjusted under 35 U.S.C. 154(b) by 0 days.

(21) Appl. No.: 14/478,763

(22) Filed: Sep. 5, 2014

(65) Prior Publication Data

US 2015/0090125 A1    Apr. 2, 2015

Related U.S. Application Data

(60) Provisional application No. 61/874,226, filed on Sep. 5, 2013.

(51) Int. Cl.
*B01D 53/22* (2006.01)
*B01D 69/12* (2006.01)
*B01D 69/04* (2006.01)
*B01D 71/02* (2006.01)

(52) U.S. Cl.
CPC .............. *B01D 53/228* (2013.01); *B01D 69/04* (2013.01); *B01D 69/12* (2013.01); *B01D 71/024* (2013.01); *B01D 53/22* (2013.01); *B01D 53/229* (2013.01); *B01D 2257/504* (2013.01); *B01D 2258/0283* (2013.01); *Y02C 10/10* (2013.01)

(58) Field of Classification Search
CPC .... B01D 53/22; B01D 53/228; B01D 53/229; B01D 69/04; B01D 69/10; B01D 69/12; B01D 67/0039; B01D 67/0069; B01D 71/024; B01D 2257/504; B01D 5528/0283
USPC ................................................. 96/5, 11; 95/51
See application file for complete search history.

(56) References Cited

U.S. PATENT DOCUMENTS

| 3,847,672 | A  | * | 11/1974 | Trocciola | H01M 8/0662 96/4 |
|---|---|---|---|---|---|
| 5,262,198 | A  | * | 11/1993 | Liu | B01D 69/04 210/490 |
| 6,793,711 | B1 | * | 9/2004 | Sammells | B01D 71/024 95/46 |
| 7,572,318 | B2 |   | 8/2009 | Jadhav et al. | |
| 7,909,911 | B2 |   | 3/2011 | Lackner et al. | |
| 7,938,893 | B2 |   | 5/2011 | Doong et al. | |
| 2002/0141919 | A1 | * | 10/2002 | Alvin | B01D 53/22 422/211 |
| 2007/0240570 | A1 | * | 10/2007 | Jadhav | B01D 53/228 96/4 |
| 2011/0168572 | A1 |   | 7/2011 | Huang | |

(Continued)

OTHER PUBLICATIONS

Lu, Bo et al., "Synthesis and characterization of thin ceramic-carbonate dual-phase membranes for carbon dioxide separation", Journal of Membrane Science, 444, May 2013, pp. 402-411.*

(Continued)

*Primary Examiner* — Jason M Greene
(74) *Attorney, Agent, or Firm* — Polsinelli PC

(57) ABSTRACT

Embodiments for a tubular ceramic-carbonate dual-phase membrane and methods for manufacturing the tubular ceramic-carbonate dual-phase membrane are disclosed.

15 Claims, 10 Drawing Sheets

(56) References Cited

U.S. PATENT DOCUMENTS

| | | | | |
|---|---|---|---|---|
| 2012/0014852 | A1* | 1/2012 | Huang | B01D 53/228 423/210.5 |
| 2013/0064724 | A1* | 3/2013 | Huang | B01D 53/228 422/168 |

OTHER PUBLICATIONS

X. Dong et al., An asymmetric tubular ceramic-carbonate dual phase membrane for high temperature CO2 separation, Chem. Commun., 2013, 49, 9654.
Jerry Y.S. Lin et al., Pre-Combustion Carbon Dioxide Capture by a New Dual-Phase Ceramic-Carbonate Membrane Reactor, DOE project review, Aug. 26, 2011.
B. Lu et al., Synthesis and Characterization of Thin Samarium Temperature Carbon Dioxide Separation Doped Ceria/Carbonate Dual-Phase Membranes for High Temperature Carbon Dioxide Separation, 2013 North American Membrane Society Meeting, Jun. 11, 2013.
Jerry Y.S. Lin et al., Pre-Combustion Carbon Dioxide Capture by a New Dual-Phase Ceramic-Carbonate Membrane Reactor, DOE project review, Jul. 10, 2013.
J.D. Figueroa et al., Advances in CO2 capture technology—The U.S. Department of Energy's Carbon Sequestration Program, International Journal of Greenhouse Gas Control 2 (2008) 9-20.
S.J. Chung et al., Dual-Phase Metal-Carbonate Membrane for High-Temperature Carbon Dioxide Separation, Ind. Eng. Chem. Res. 2005, 44, 7999-8006.
N. Du et al., Advances in high permeability polymeric membrane materials for CO2 separations, Energy Environ. Sci., 2012, 5, 7306.
P. Luis et al., Recent developments in membrane-based technologies for CO2 capture, Progress in Energy and Combustion Science 38 (2012) 419-448.
T.-L. Chew et al., Ordered mesoporous silica (OMS) as an adsorbent and membrane for separation of carbon dioxide (CO2), Advances in Colloid and Interface Science 153 (2010) 43-57.
J. Caro et al., Zeolite membranes—Recent developments and progress, Microporous and Mesoporous Materials 115 (2008) 215-233.
Y. Sakamoto et al., Preparation and CO2 separation properties of amine-modified mesoporous silica membranes, Microporous and Mesoporous Materials 101 (2007) 303-311.
X. Gu et al., Synthesis of Defect-Free FAU-Type Zeolite Membranes and Separation for Dry and Moist CO2/N2 Mixtures, Ind. Eng. Chem. Res. 2005, 44, 937-944.
S. Li et al., High-Flux SAPO-34 Membrane for CO2/N2 Separation, Ind. Eng. Chem. Res. 2010, 49, 4399-4404.
D.W. Shin et al., Synthesis and CO2/N2 gas permeation characteristics of ZSM-5 zeolite membranes, Microporous and Mesoporous Materials 85 (2005) 313-323.
M. Anderson et al., Carbonate—ceramic dual-phase membrane for carbon dioxide separation, Journal of Membrane Science 357 (2010) 122-129.
M. Anderson et al., Carbon Dioxide Separation and Dry Reforming of Methane for Synthesis of Syngas by a Dual-phase Membrane Reactor, AIChE Journal Jun. 2013 vol. 59, No. 6, 2207-2218.
Z. Rui et al., Ionic conducting ceramic and carbonate dual phase membranes for carbon dioxide separation, Journal of Membrane Science 417-418 (2012) 174-182.
J. Kniep et al., Autothermal Reforming of Methane in a Proton-Conducting Ceramic Membrane Reactor, Ind. Eng. Chem. Res. 2011, 50, 12426-12432.
Z. Rui et al., Modeling and analysis of carbon dioxide permeation through ceramic-carbonate dual-phase membranes, Journal of Membrane Science 345 (2009) 110-118.
M. Anderson, Carbonate-Ceramic Dual-Phase Membranes for High Temperature Carbon Dioxide Separation, PhD Thesis, Arizona State University, May 2011.
T. Norton, Synthesis and Stability of Ceramic-Carbonate Dual-Phase Membrane for Carbon Dioxide Separation. PhD Thesis, Arizona State University, Dec. 2013.
Y. Li et al., Performance of ionic-conducting ceramic/carbonate composite material as solid oxide fuel cell electrolyte and CO2 permeation membrane, Catalysis Today 148 (2009) 303-309.
J.L. Wde et al., Composite electrolyte membranes for high temperature CO2 separation, Journal of Membrane Science 369 (2011) 20-29.
B. Lu et al., Synthesis and characterization of thin ceramic-carbonate dual-phase membranes for carbon dioxide separation, Journal of Membrane Science 444 (2013) 402-411.
N. Xu et al., Silver-molten carbonate composite as a new high-flux membrane for electrochemical separation of CO2 from flue gas, Journal of Membrane Science 401-402 (2012) 190-194.
L. Zhang et al., High CO2 permeation flux enabled by highly interconnected three-dimensional ionic channels in selective CO2 separation membranes, Energy Environ. Sci., 2012, 5, 8310.
Z. Liu et al., Fabrication of asymmetric tubular mixed-conducting dense membranes by a combined spin-spraying and co-sintering process, Journal of Membrane Science 415-416 (2012) 313-319.
X. Li et al., Effective Ionic Conductivity of a Novel Intermediate-Temperature Mixed Oxide-Ion and Carbonate-Ion Conductor, Journal of the Electrochemical Society, 158 (2), B225-B232 (2011).
Y.-P. Fu et al., Preparation and Characterization of Samaria-Doped Ceria Electrolyte Materials for Solid Oxide Fuel Cells, J. Am. Ceram. Soc., 91 [1] 127-131 (2008).
A. Boden et al., Conductivity of SDC and (Li/Na)2CO3 composite electrolytes in reducing and oxidising atmospheres, Journal of Power Sources 172 (2007) 520-529.
T.-H. Bae et al., Evaluation of cation-exchanged zeolite adsorbents for post-combustion carbon dioxide capture, Energy Environ. Sci., 2013, 6, 128.
K.G. Harry et al., A non-destructive technique for measuring ceramic porosity using liquid nitrogen, Journal of Archaeological Science 31 (2004) 1567-1575.
T.C. Merkel et al., Power plant post-combustion carbon dioxide capture: an opportunity for membranes, Journal of Membrane Science 359 (2010) 126-139.
M.O. Daramola et al., Potential Applications of Zeolite Membranes in Reaction Coupling Separation Processes, Materials 2012, 5, 2101-2136.
Jerry Y.S. Lin et al, Dual Phase Membrane for High temperature CO2 Separation, Technical Progress Report, Dec. 2002.
K. Kaggerud et al., Power Production with CO2 Management— Integration of High Temperature CO2 Selective Membranes in Power Cycles, Greenhouse Gas Control Technologies 2005;7:1857-60.
G.J. Stiegel, Overview of Advanced Gas Separation Technologies for Gasification-Based Energy Systems, Fuel Chemistry Division Preprints 2003, 48(1), 235.
M. Anderson et al., Synthesis and Characterization of a Carbonate-Ceramic Dual-Phase Membrane for Carbon Dioxide Separation. Proc. 9th Internal. Conf. on Inorganic membranes, R. Bredesen and H. Rader (Eds) (2006) 678.
N.G. Nwogu, Improved Carbon Dioxide Capture Using Nanostructured Ceramic Membranes, Low Carbon Economy, 2013, 4, 125-128.
X. Dong et al., Mixed conducting ceramic membranes for high efficiency power generation with CO2 capture, Current Opinion in Chemical Engineering 2012, 1:163-170.
A.D Ebner et al., State-of-the-art Adsorption and Membrane Separation Processes for Carbon Dioxide Production from Carbon Dioxide Emitting Industries, Sep. Sci. Technol., 2009, 44, 1273.
A. Nijmeijer, Centrifugal casting of tubular membrane supports, American Ceramic Society Bulletin, vol. 77, No. 4 pp. 95-98, 1998.

* cited by examiner

SDC/SDC-BYS porous tube

SDC/SDC-BYS membrane

- Pre-combustion $CO_2$ capture at higher temperatures (400-800°C)

$$CO + H_2O \rightleftharpoons H_2 + CO_2$$

- Reforming reaction with $CO_2$ removal (600-900°C)

$$CH_x + H_2O \rightleftharpoons H_2 + CO + CO_2$$

TUBULAR CERAMIC-CARBONATE DUAL-PHASE MEMBRANES AND METHODS OF MANUFACTURE THEREOF

CROSS REFERENCE TO RELATED APPLICATIONS

This application claims benefit to U.S. provisional patent application Ser. No. 61/874,226, filed on Sep. 5, 2013, which is incorporated by reference in its entirety.

STATEMENT OF GOVERNMENT SPONSORED SUPPORT

This invention was made with government support under DE-FE0000470 awarded by the Department of Energy. The government has certain rights in the invention.

FIELD

This document relates to dual-phase membranes and in particular to asymmetric tubular dual-phase ceramic-carbonate membranes used for high temperature carbon dioxide separation.

BACKGROUND

Increasing carbon dioxide concentration in the atmosphere is directly related to the present environmental problems such as global warming. Power plants that burn fossil fuel generate about 40% of the $CO_2$ emissions worldwide. It is predicted that under a business-as-usual scenario (e.g., no CO2 emission mitigation), global $CO_2$ emissions from coal combustion will increase from 9 Gton/year in 2000 to 32 Gton/year in 2050. Therefore, the control of CO2 emissions demands the development of new and better technologies. There different strategies are normally used to achieve CO2 separation and capture from a fossil-fired power production: post-combustion, pre-combustion and oxyfuel.

Membrane systems have the potential to separate carbon dioxide at lower costs and with lower energy penalties than other related technologies. High temperature $CO_2$-permselective membranes could be applied to pre and post-combustion process for $CO_2$ capture. Furthermore, high temperature $CO_2$-permselective membranes could be used in reactions involving $CO_2$, such as water gas shift reaction or provide other types of innovative process designs, such as integrated gasified combined cycle (IGCC). Similarly, many processes in chemical and refinery industries involve $CO_2$ either as a reactant or product. One reaction is dry-reforming of methane with $CO_2$ to produce hydrogen. High temperature $CO_2$-permselective membranes can be used in membrane reactors to improve the efficiency of these chemical reaction processes.

Many early efforts have been reported on developments of microporous inorganic membranes for $CO_2$ separation. These membranes are perm-selective for $CO_2$ at low temperatures only. Dense, nonporous ceramic membranes are known for the infinitely large selectivity for $O_2$ over $N_2$ and other gases, and high $O_2$ permeance at temperatures above 700° C. Research efforts on synthesis of dense $Li_2ZrO_3$ and $Li_4SiO_4$ membranes for high temperature separation of $CO_2$ were reported, but these membranes exhibit a $CO_2/N_2$ selectivity of about 5 and $CO_2$ permeance of $10^{-8}$ mol/s·Pa·m² at 525° C. It is known that molten carbonate, such as $Li_2CO_3/K_2CO_3$, can conduct $CO_3^{2-}$ at a very high rate at high temperatures. A metal-carbonate dual-phase membrane was prepared and shown to be able to separate CO2 from N2, CO2 and O2 mixture. However, the permeation of $CO_2$ through the metal-carbonate membrane requires the presence of oxygen and the membrane suffers from a stability issue due to metal oxidation and metal-carbonate interaction. These problems have been addressed by replacing the metal phase with a mixed electronic-ionic conducting metal oxide phase.

Recently, the inventors have reported that a dual-phase membrane consisting of a molten carbonate ($LiCO_2/Na_2CO_3/K2CO_3$) entrapped in a porous perovskite-type La—Sr—Co—$FeO_3$ ceramic support is perm-selective to $CO_2$ (with $CO_2/N_2$ selectivity well above 225) with $CO_2$ permeance of above $1.0 \times 10^{-8}$ mol/m₂·s·Pa at temperatures above 500° C. These dual-phase membranes had a thickness larger than 300 μm to 3 mm and were prepared with a disc-like configuration. However, these dual-phase membranes in a disc-like configuration having larger thicknesses were found not to have any practical applications.

BRIEF DESCRIPTION OF THE DRAWINGS

Corresponding reference characters indicate corresponding elements among the view of the drawings. The headings used in the figures should not be interpreted to limit the scope of the claims.

DETAILED DESCRIPTION

Figure 1:
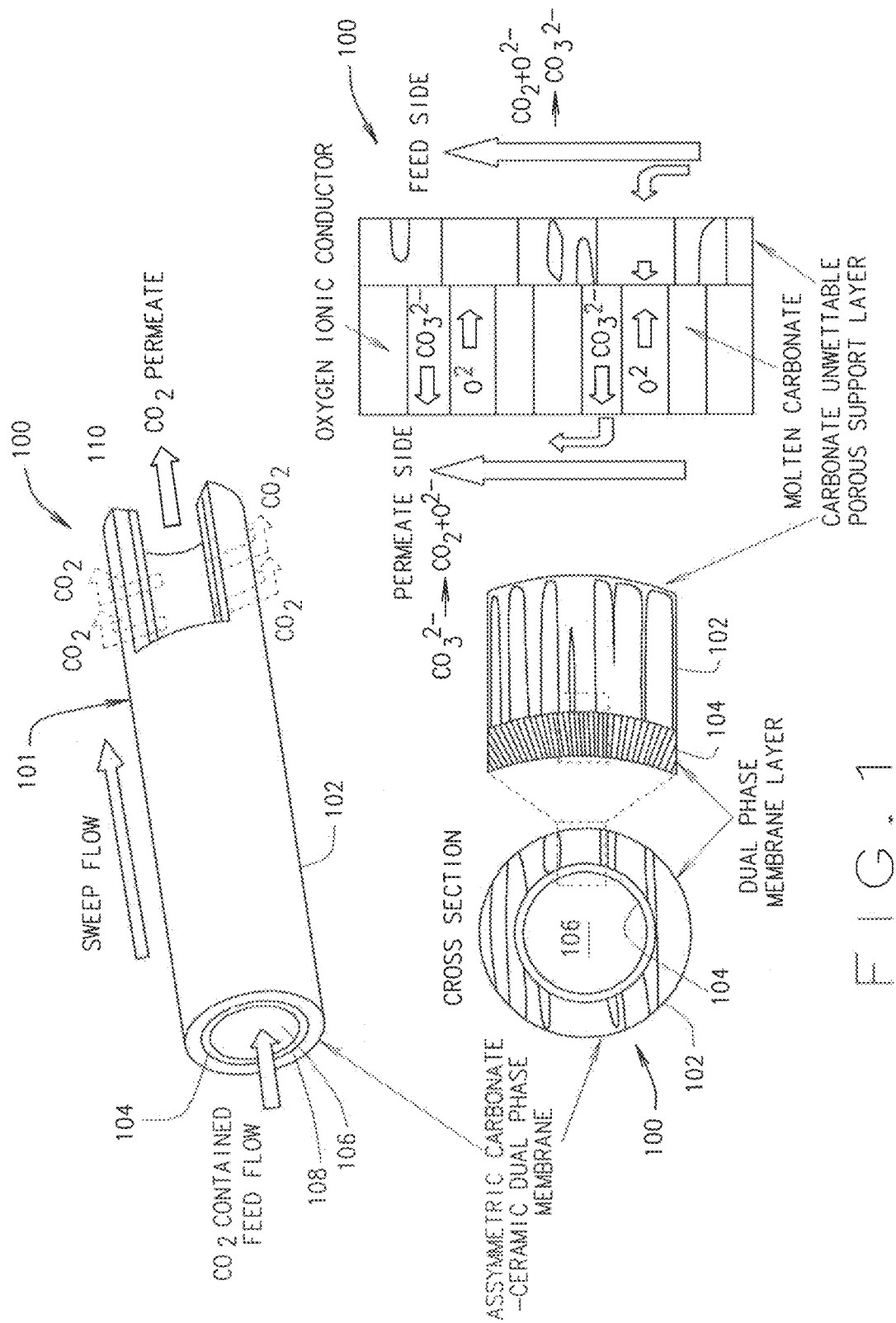
FIG. 1 is an illustration showing the various structural and operational aspects of a tubular ceramic-carbonate dual-phase membrane.

Embodiments for tubular ceramic-carbonate dual-phase membranes and method for manufacturing such dual-phase membranes are described herein. Referring to the drawings, one embodiment of a tubular ceramic-carbonate dual-phase membrane is illustrated and generally indicated as 100 in FIGS. 1-12.

As shown in FIG. 1, the tubular ceramic-carbonate dual-phase membrane 100 may be made of a porous ceramic phase that serves as an oxygen ion conductor and a carbonate phase that allows $CO_2$ permeation through an electrochemical conversion of carbonate ions ($CO_3^{2-}$) and the subsequent transport of this ionic species across a tubular-shaped body 101 that defines the tubular ceramic-carbonate dual-phase membrane 100.

As further shown, the tubular-shaped body 101 forms an elongated channel 106 extending between a proximal opening 108 at one end and a distal opening 110 at the opposite end that forms a conduit configured to allow the passage of gas or fluid through the channel 106. In addition, the tubular-shaped body 101 includes an outer support layer 102 made from a material that is non-wettable with molten carbonate and a thin inner layer 104 made from a material that is wettable with molten carbonate. As used herein, the term "wettable" refers to the ability of a liquid to maintain contact with a solid surface which results from intermolecular interactions when the two are brought together, while the term "non-wettable" conversely refers to the inability of a liquid to maintain contact with a solid surface when the liquid and solid surface are brought together. As such, the outer support layer 102 may be made from a material that does not permit the infiltration of carbonate, while the thin inner layer 104 may be made from a material that allows the molten carbonate to infiltrate.

In some embodiments, the thin inner layer 104 may be made of an oxygen ionic or mixed ionic-electronic conducting porous ceramic material that is wettable with metal carbonate so that the pores fill with molten carbonate during the manufacturing process. The thin inner layer 104 is made from the porous ceramic material filled with carbonate that allows ionic oxygen to be conducted through the thin inner layer 104 during a $CO_2$ separation process.

In some embodiments, the thin inner layer 104 may have porosity in the range of 0.20 to 0.80 and a pore size that ranges from 5 nm to 5 μm. In some embodiments, the thin inner layer 104 may have a thickness that ranges substantially from 1 to 150 μm. In some embodiments, the outer support layer 102 may have porosity in the range of 0.25 to 0.75 and a pore size that ranges from 0.05 μm to 10 μm. Moreover, in some embodiments the outer support layer 102 may have a thickness that ranges substantially from 1-3 mm.

In one application, the tubular ceramic-carbonate dual-phase membrane 100 may be utilized in a $CO_2$ separation system that separates $CO_2$ under high temperature conditions. For example, in one $CO_2$ separation application, a $CO_2$-containing gas flows under high pressure through the channel 106 of the tubular ceramic-carbonate dual-phase membrane 100, while a sweep gas under lower pressure flows outside the tubular-shaped body 101 to collect $CO_2$ that is conducted through the thin inner layer 104 and then transported through the outer support layer 102. To achieve $CO_2$ permeation, the thin inner layer 104 acts as an oxygen ionic conductor for transporting $CO_2$ from the $CO_2$-containing gas flowing through the channel 106 to the sweep gas flowing outside the tubular-shaped body 101 of the tubular ceramic-carbonate dual-phase membrane 100. This permeation of CO2 through the tubular-shaped body 101 is accomplished by attaching an oxygen ion to $CO_2$ from the $CO_2$-containing gas such that the resulting $CO_3^{2-}$ is conducted through the tubular-shaped body 101 where the oxygen ion detaches to allow $CO_2$ removed from the $CO_2$-containing gas to be entrained in the sweep gas. It has been found that the tubular ceramic-carbonate dual-phase membrane 100 exhibits high CO2 permeance of $1$-$50 \times 10^{-8}$ mol m$^{-2}$ s$^{-1}$ Pa$^{-1}$ in a high temperature range between 500-900° C.

Figure 2:
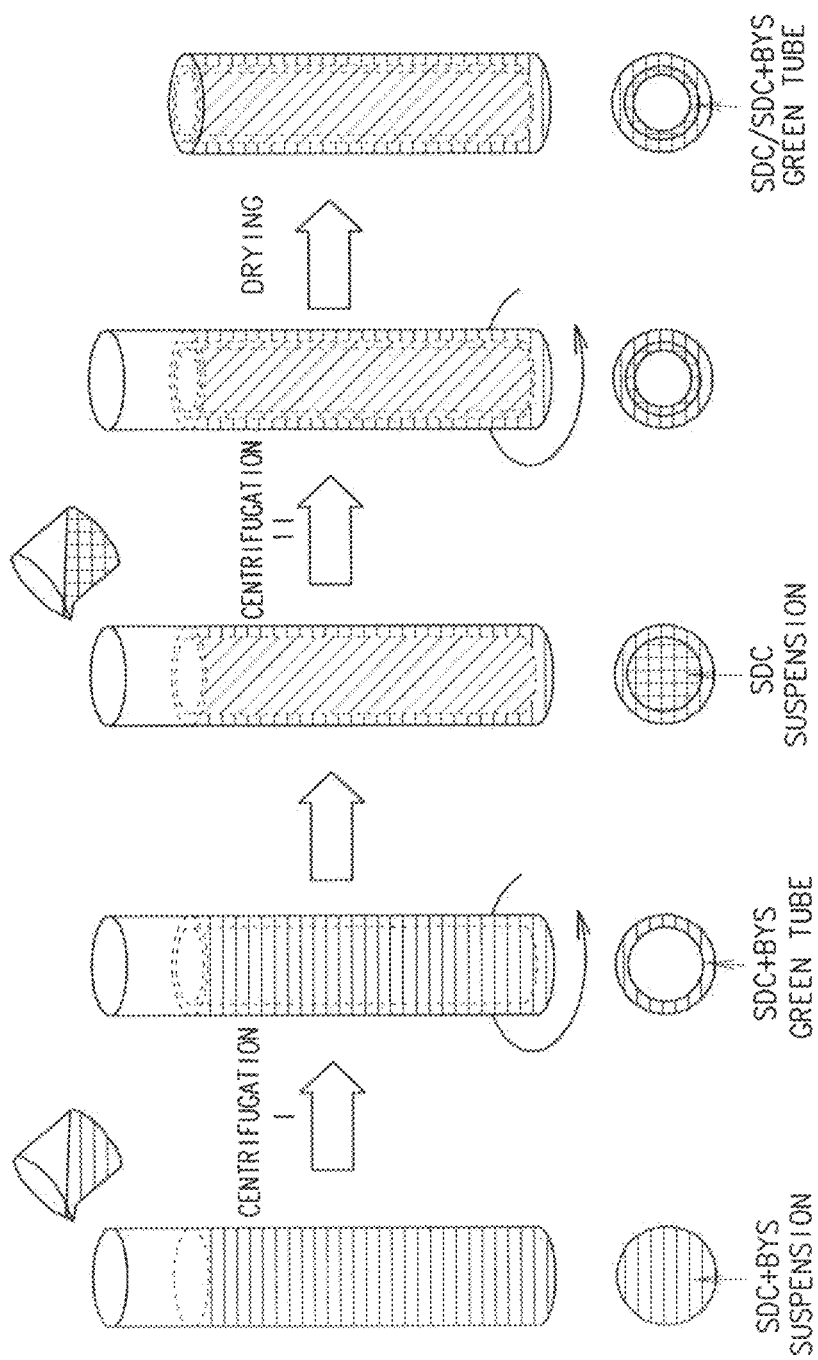
FIG. 2 is an illustration showing a sequence for manufacturing the tubular ceramic-carbonate dual-phase membrane.

Referring to FIG. 2, one method for fabricating the tubular ceramic-carbonate dual-phase membrane 100 may include a centrifugal casting method. In one method, the outer support layer 102 is formed by pouring a predetermined amount a liquid suspension containing samaria doped ceria ("SDC") and $Bi_{1.5}Y_{0.3}Sm_{0.2}O_{3-\delta}$ or bismuth-yttria-smaria ("BYS") particles into a stainless steel tube in which the SDC/BYS suspension is non-wettable with metal carbonate and exhibits high oxygen ionic conductivity. In some embodiments, the SDC/BYS suspension may have a composition of 55 wt % SDC and 45 BYS prepared by a milling process. The SDC/BYS suspension is then spun in a centrifuge between 3000-5000 rpm where centrifugal force causes the outer support layer 102 made from the SDC/BYS suspension to be formed. The liquid in the middle of the stainless steel tube is then poured out. An SDC suspension in the form of an extremely diluted SDC slurry is then poured in the channel 106 defined by the outer support layer 102 and the SDC suspension is then spun in a centrifuge until the thin inner layer 104 made of SDC suspension is formed and bonds to the inner surface of the outer support layer 102 made of the SDC/BYS mixture. The thin outer support layer 102 and the thin inner layer 104 collectively form a tubular-shaped dry compact. In some embodiments, the SDC used in the outer support layer 102 and the SDC used in the thin inner layer 104 may have a different particular size and porosity. In addition, the tubular-shaped dry compact is removed from the stainless steel tube and sintered at 1150° C. for 12 hours. The tubular-shaped dry compact is then immersed in a molten carbonate that is heated to a melting temperature such that the molten carbonate contacts and fills the pores of the thin inner layer 104. In some embodiments, the molten carbonate may be poured through the channel 106 of the tubular shaped dry compact such that the molten carbonate similarly contacts and fills the pores of the thin inner layer 104. The molten carbonate bonds with the thin inner layer 104 made from a material that is wettable with carbonate, while the molten carbonate will not bond with the outer support layer 102 since the outer support layer 102 is made from a material that is non-wettable with carbonate. Due to the fact that the outer support layer 102 is made from SDC-BYS that forms a porous structure and is non-wettable with carbonate, the porous structure of this outer support layer 102 may be maintained after infiltration.

Figure 3:
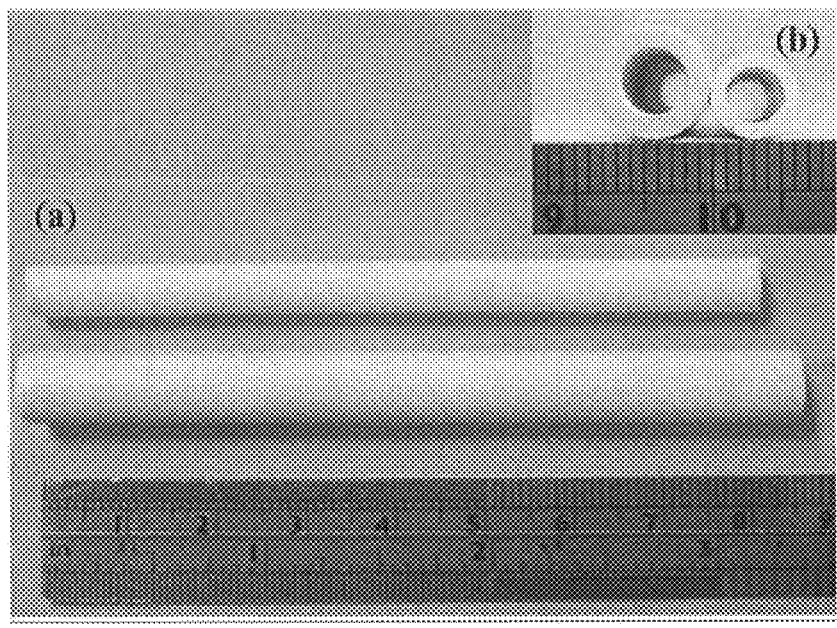
FIG. 3 is a picture illustrating an embodiment of the tubular ceramic-carbonate dual phase membrane using porous $Bi_{1.5}Y_{0.3}Sm_{0.2}O_{3-\delta}$ ("BYS"), SDC or SDC/BYS tubular supports prepared using a centrifugal casting process.

Referring to FIG. 3, a picture is shown that illustrates the porous BYS, SDC or SDC/BYS tubular-shaped bodies 101 prepared using the above centrifugal casting method.

Figure 4A:
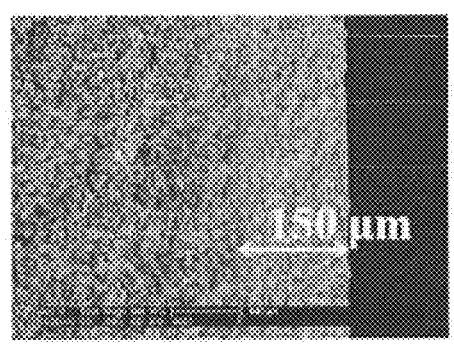
FIG. 4A shows a picture of a cross-sectional view of a dual-phase membrane containing a thin dual-phase SDC-carbonate layer.
Figure 4B:
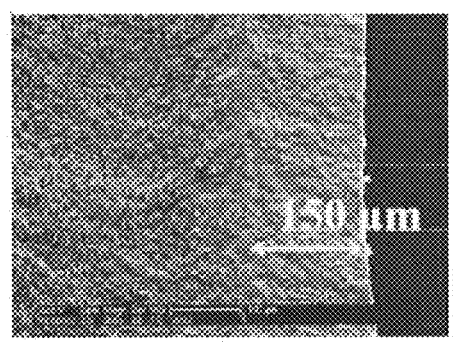
FIG. 4B shows a picture of a cross-sectional view of a dual-phase membrane containing a thin dual-phase SDC-carbonate layer.

Referring to FIG. 4A and FIG. 4B, cross-sectional views of the tubular ceramic-carbonate dual-phase membrane 100 are shown that illustrates the relative thinness 150 μm of the thin inner layer 104 made from SDC in comparison to the greater thickness of the outer support layer 102 made from SDC/BYS. FIG. 4A shows the relatively thick outer support layer 102 and the relatively thin inner layer 104, while FIG. 4B shows the cross-section of the tubular ceramic-carbonate dual-phase membranes 100 with the thin porous SDC layer filled with carbonate. In addition, the tubular ceramic-carbonate dual-phase membranes 100 are hermetic to helium as well as nitrogen or any gas other than $CO_2$.

Figure 5:
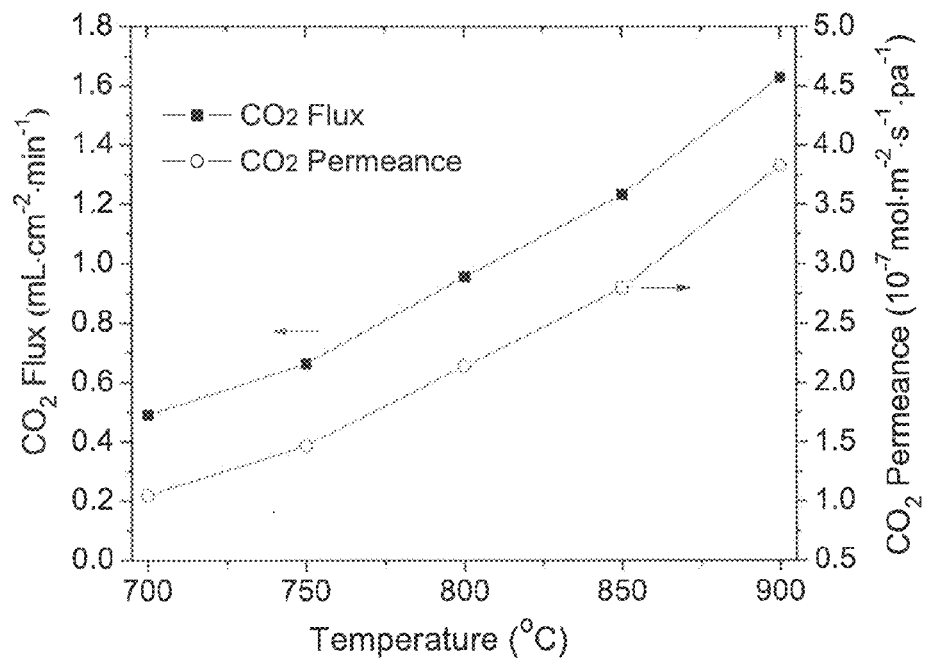
FIG. 5 is a graph showing $CO_2$ permeation and permeance of a SDC tubular ceramic-carbonate dual-phase membrane as a function of temperature.

Referring to FIG. 5, a graph shows $CO_2$ flux and permeance of the tubular ceramic-carbonate dual-phase membrane 100 using SDC as a function of temperature. In the graph, the feed side includes syngas at a flow rate of 100 ml*min$^{-1}$ and the sweep side includes He at a flow rate of 100 ml*min$^{-1}$. The tubular-shaped body 101 has a thickness of 120 μm. The tubular ceramic-carbonate dual-phase membranes 100 were studied for $CO_2$ separation under syngas containing $CO_2$, CO, $N_2$ and $H_2$ in which the tubular ceramic-carbonate dual-phase membranes 100 are perm-selective to $CO_2$ only. It was found that a thin membrane exhibits very high separation performance. For example, at 900° C., the $CO_2$ permeation flux of the tubular ceramic-carbonate dual-phase membrane 100 reached 1.63 ml*$cm^{-2}$*min1- and 3.82×$10^{-7}$ mol*s–1*$Pa^{-1}$, respectively, while at 700° C., the $CO_2$ permeation flux of the tubular ceramic-carbonate dual-phase membrane 100 reached 0.49 ml*$cm^{-2}$*$min^{-1}$ and 1.05×$10^{-7}$ mol*$m^{-2}$*$s^{-1}$*$Pa^{-1}$, respectively. As such, it can be concluded that reducing the thickness of the tubular-shaped body 101 improves $CO_2$ permeation performance.

Figure 6:
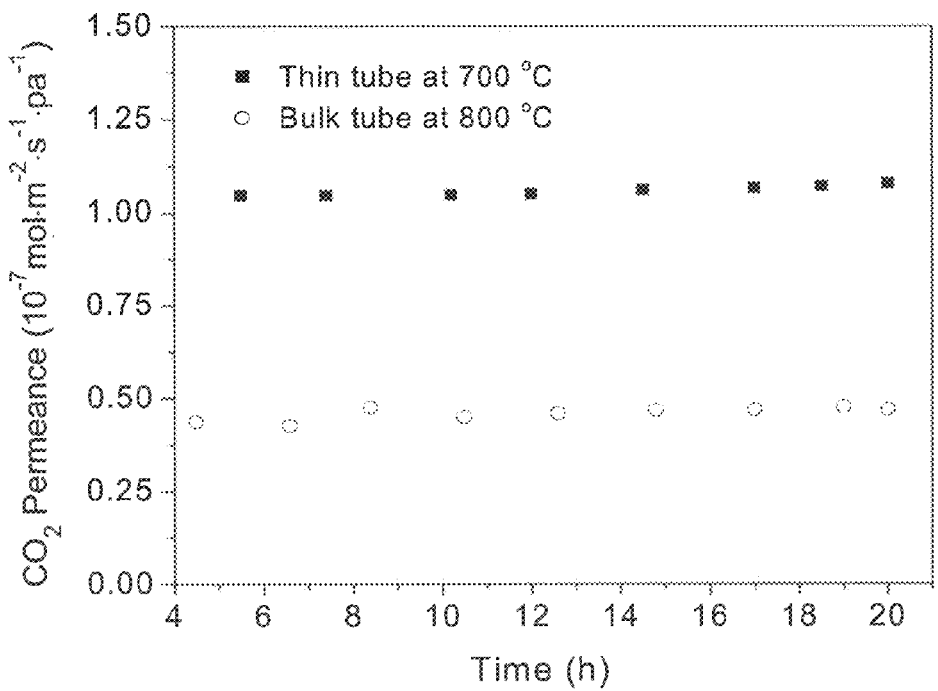
FIG. 6 is a graph comparing $CO_2$ permeation permeance of a thick SDC-carbonate tubular ceramic-carbonate dual-phase membrane with an asymmetric, thin tubular dual-phase membrane.

In addition, the stability of the tubular ceramic-carbonate dual-phase membrane 100 was investigated under a syngas atmosphere. Referring to FIG. 6, a graph shows the comparison of $CO_2$ permeation permeance of a thick (2 mm) SDC-carbonate tubular and asymmetric, thin (150 μm) tubular dual-phase membrane 100 with synthetic syngas as the feed gas and He as the sweep gas with both gases at 100 ml*$min^{-1}$, at a pressure of 1 atmosphere. As shown, the $CO_2$ permeances of the tubular ceramic-carbonate dual-phase membranes 100 were stable during the operating period. The results confirm that the tubular ceramic-carbonate dual-phase membranes 100 have a potential for practical application in pre-combustion $CO_2$ capture.

There are major applications for tubular ceramic-carbonate dual-phase membranes 100 in membrane reactors for reactions involving carbon dioxide as a reactant or by-product. These reactions are found in many chemical and energy production processes. For example there are two representative processes. First, a water gas shift (WGS) reaction:

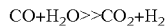

The other is a steam reforming reaction or gasification reaction:

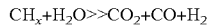

Figure 7:
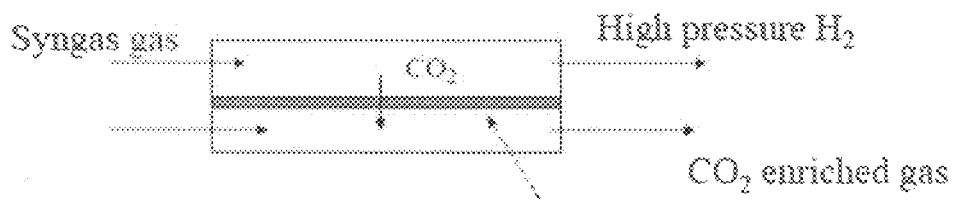
FIG. 7 is a schematic showing applications of tubular ceramic-carbonate dual-phase membranes in membrane reactors for reactions with carbon dioxide removal.
Figure 7:
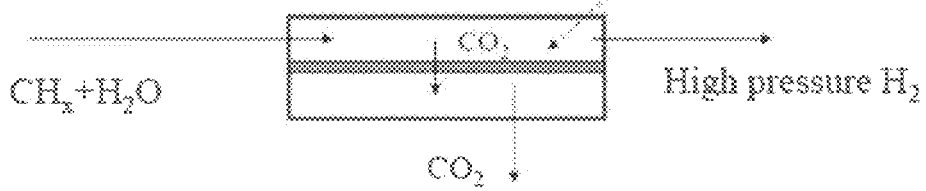

Both reactions operate at high temperatures and high pressure. Such high pressure provides a driving force for CO2 to permeate through the membrane wall, thereby resulting in enhanced conversion and production of hydrogen at high pressure as shown in FIG. 7, which shows a schematic of the various applications for tubular ceramic-carbonate dual-phase membranes 100 in membrane reactors with carbon dioxide removal.

Figure 8:
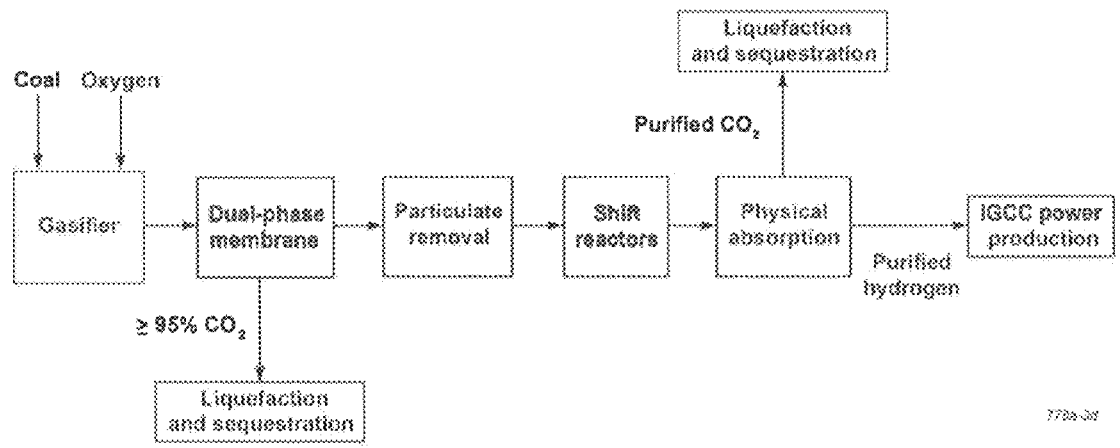
FIG. 8 is a simplified block diagram illustrating a process for IGCC with $CO_2$ capture using a combination of the tubular ceramic-carbonate dual-phase membrane and reduced physical absorption separations.

Referring to FIG. 8, a simplified block diagram shows the process flow for an Integrated Gasification Combined Cycle ("IGCC") with $CO_2$ capture using a combination of the tubular ceramic-carbonate dual-phase membrane 100 to remove 90% of the $CO_2$ in the raw syngas prior to the water gas shift reaction (WGS). There are four potential advantages to using this process: (1) the high pressure of the raw syngas provides high driving force for $CO_2$ separation by the tubular ceramic-carbonate dual-phase membrane 100, which allows for the capture of 90% of $CO_2$ from raw syngas using a relatively small membrane area due to the tubular configuration of the tubular ceramic-carbonate dual-phase membrane 100; (2) the raw syngas is at temperatures over 800° C., which is ideal temperature range for use of the tubular ceramic-carbonate dual-phase membrane 100 to achieve high $CO_2$ permeance; (3) reduced $CO_2$ levels in the raw syngas before the downstream WGS reactor facilitate the conversion of $CO_2$ into $H_2$, and therefore improves the process efficiency of the WGS step, especially in the case of WGS membrane reactor; and (4) Because a portion of the $CO_2$ is removed from the raw syngas by the dual-phase membranes before the downstream WGS reaction, less $CO_2$ needs to be captures after the WGS step.

Figure 9:
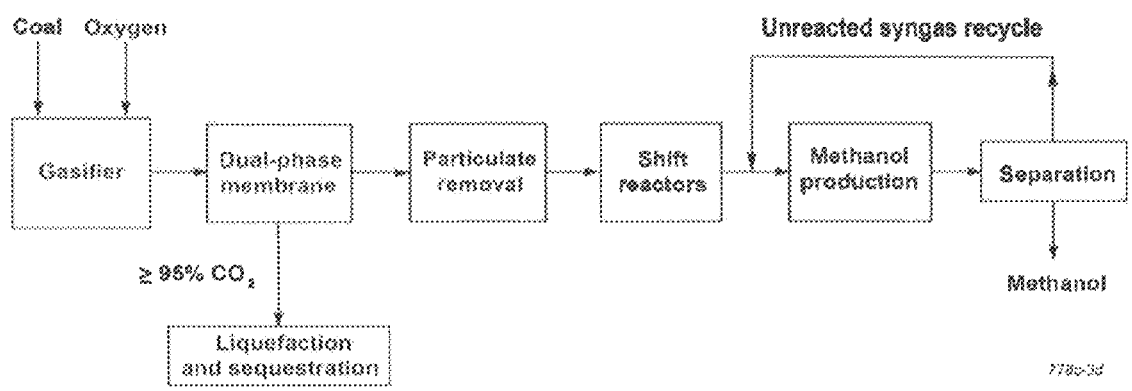
FIG. 9 is a simplified block diagram illustrating a process for methanol production with $CO_2$ capture by the tubular ceramic-carbonate dual-phase membrane.
Figure 10:
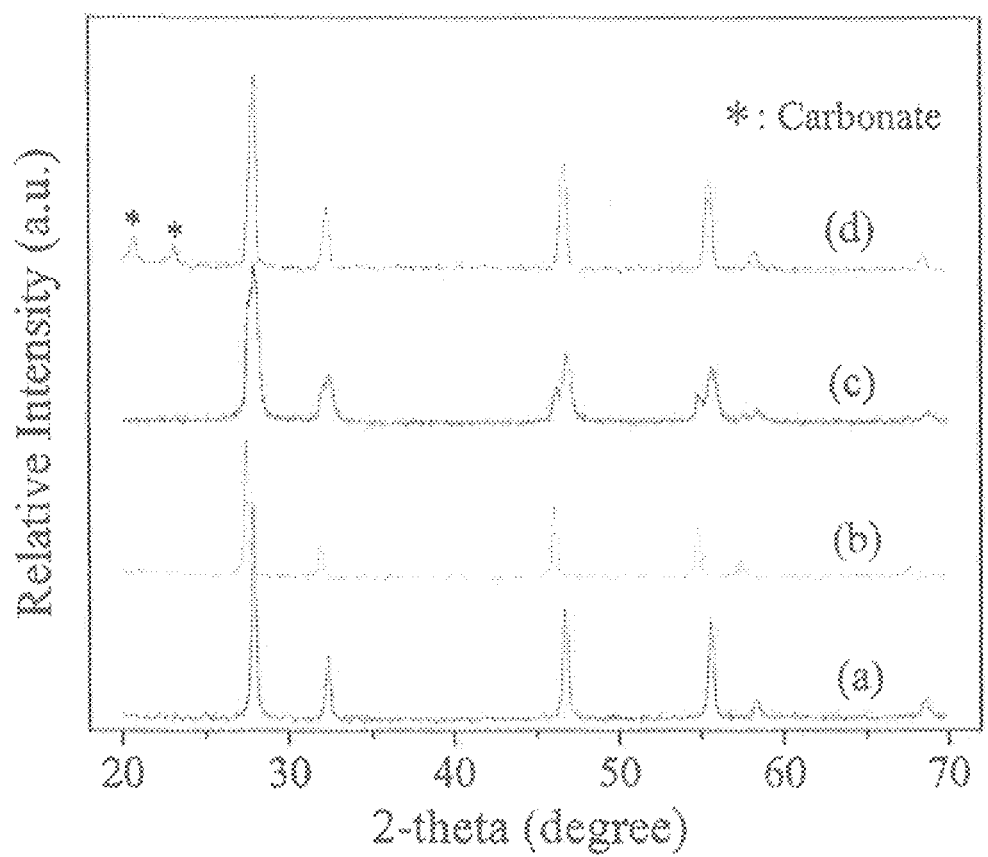
FIG. 10 is a graph showing various XRD patterns that demonstrate that SDC and BYs are chemically compatible with carbonate.

Referring to FIG. 9, a simplified block diagram shows the process flow for methanol production with $CO_2$ capture using the tubular ceramic-carbonate dual-phase membrane 100. For coal to methanol conversion, the tubular ceramic-carbonate dual-phase membrane 100 can be used for $CO_2$ capture from gasification gas prior to the WGS step shown in FIG. 9. The process that uses the tubular ceramic-carbonate dual-phase membrane 100 can take advantage of the high pressure of raw syngas for providing a large driving force, which partially reduces the load of the downstream physical absorption separation of $CO_2$, thus reducing significantly the energy cost for $CO_2$ capture. In addition, the lowering $CO_2$ content in the treated raw syngas can facilitate the WGS reaction. The size of the WGS reactor can also be reduced due to the smaller volume of the raw syngas steam after $CO_2$ removal. Further, the upstream $CO_2$ capture may assist in increasing $H_2$/CO or $H_2/CO_2$ ratios required for methanol synthesis.

Additional details of the tubular ceramic-carbonate dual-phase membrane 100 may be found in the inventors' publication entitled "Asymmetric Tubular Ceramic-Carbonate Dual Phase Membrane for High Temperature $CO_2$ Separation", which provides a description of a tubular ceramic-carbonate dual-phase membrane and a comparison with a ceramic-carbonate dual-phase membrane having a disc-like configuration. The above publication is incorporated by reference in its entirety and attached hereto as Addendum A.

Additional details for manufacturing the tubular ceramic-carbonate dual-phase membrane 100 may be found in a second publication entitled "Centrifugal Slip Casting of Asymmetric Tubular Ionic Conducting Ceramic-Carbonate Dual-Phase Membranes for $CO_2$ Separation" provides a description of a centrifugal slip casting process for manufacturing the tubular ceramic-carbonate dual-phase membrane 100. The above publication is incorporated by reference in its entirety and is attached hereto as Addendum B.

Moreover, additional experimental details related to the tubular ceramic-carbonate dual-phase membrane 100 conducted by the inventors are disclosed under a paper entitled "Supporting Information—Asymmetric Tubular Ceramic-Carbonate Dual-Phase Membrane for High Temperature $CO_2$ Separation", which is incorporated by reference in its entirety and attached hereto as Addendum C.

Finally, a PowerPoint presentation directed to aspects of the tubular ceramic-carbonate dual-phase membrane 100 entitled "Pre-Combustion Carbon Dioxide Capture by a New Dual-Phase Ceramic-Carbonate Membrane Reactor" is also incorporated by reference in its entirety and attached hereto as Addendum D.

Testing

The crystal structures of porous SDC-BYS support of the outer support layer 102 and the SDC-carbonate of the thin inner layer 104 for the tubular ceramic-carbonate dual-phase membrane 100 were analyzed first to confirm the chemical compatibility of SDC, BYS and carbonate. As shown in 10(a) and 10(b), the SDC and BYS exhibit typical fluorite structure. From FIG. 10(c), the SDC and BYS phase are observed in the porous support, indicating that SDC is chemical compatible with BYS. FIG. 10(c) exhibits mixed crystal phases of SDC and carbonate. Two carbonate diffraction peaks can be found from 20 to 25 degrees. No obvious impurity phase can be observed, thereby suggesting that SDC and BYS are chemically compatible with carbonate.

For the tubular ceramic-carbonate dual-phase membrane 100, the microstructure (pore size and porosity) of the porous ceramic substrate is closely related to the $CO_2$ separation performance. As shown in FIG. 2 of the publication attached as Addendum A, the thin inner layer 104 made from SDC with a thickness of about 150 μm is well bound with the outer support layer 104 made from SDC-BYS. The thin inner layer 104 had a high porosity and uniform pore structure (FIG. 2B of Addendum A). The average porosity of the SDC/SDC-BYS substrate was estimated to be 35%±5%. At high temperature, the porous SDC of the thin inner layer 104 was infiltrated with molten carbonate. After infiltration, the thin inner layer 104 is dense, whereas the outer support layer 102 made from SDC-BYS is still porous because of the carbonate non-wettable property of BYS (FIG. 2C of Addendum A). From FIG. 2D of Addendum A, SDC and carbonate phases can be distinguished easily and are well mixed. The off-white phase with clear grain boundary is SDC, while the dark grey phase is carbonate.

Figure 11:
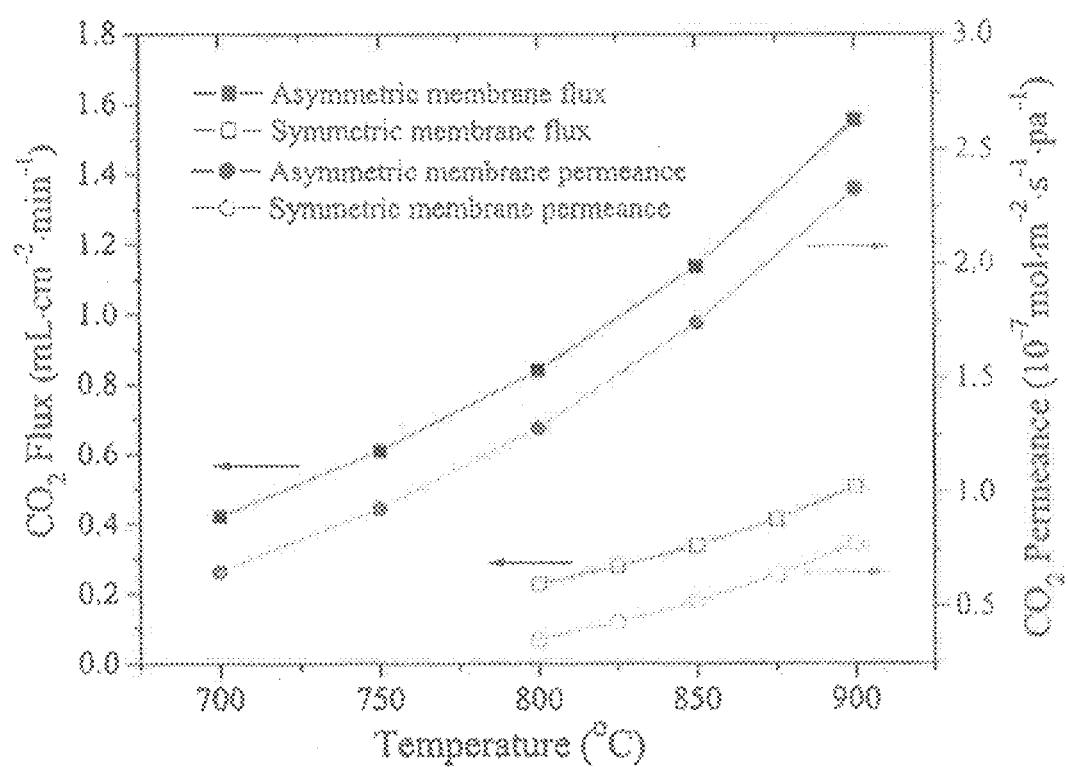
FIG. 11 is a graph showing $CO_2$ permeation flux and permeance of asymmetric and symmetric tubular dual-phase membranes as a function of temperature.

The asymmetric tubular SDC-carbonate dual phase membrane with the separation layer of 150 μm and the porous support of about 1.5 mm was applied to evaluate the $CO_2$ permeation performance. For comparison, the $CO_2$ permeation through the symmetric tubular SDC-carbonate membrane with the thickness of 1.5 mm was tested as well. The temperature dependence of $CO_2$ permeation flux and $CO_2$ permeance of the asymmetric and symmetric membranes are shown in FIG. 11. Both $CO_2$ flux and permeance increase with increasing temperature. At 900° C., the $CO_2$ flux and permeance of the asymmetric membrane are 1.56 ml·cm$^{-2}$·min$^{-1}$ and 2.33×10$^{-7}$ mol·m$^{-2}$·s$^{-1}$·Pa$^{-1}$, respectively, which are 3 times that of the symmetric membrane. At 800° C., the difference reaches 3.6 times. Therefore, reducing the thickness of the membrane is an effective route to improve the $CO_2$ permeation performance. Because of the gas transport resistance of the porous SDC-BYS support, however, the increase of $CO_2$ flux and permeance is not as large as the reducing of membrane thickness (nearly 10 times). This was also observed in preparing asymmetric mixed-conducting membranes.

The $CO_2$ permeation activation energy of the asymmetric membrane is about 60.3 kJ·mol$^{-1}$ (FIG. 11), which is lower than that of the symmetric tubular membrane (81.2 kJ·mol$^{-1}$) but close to that of the reported disk thick membrane with similar SDC and carbonate composition. The difference of the activation energy is caused by the different microstructure of the SDC substrate. The asymmetric SDC/SDC-BYS substrate sintered at relatively lower temperature (1120° C.) than the symmetric SDC substrate (1420° C.), therefore the porosity may be relatively high, leading to high ratio of carbonate to SDC in the membrane. Generally, the high relative amount of carbonate in the membrane results in low $CO_2$ permeation activation energy because the activation energy of carbonate ionic conductivity of the carbonate phase is lower than oxygen ionic conductivity of the SDC phase. Similar result was reported by Bodén et al. It was observed that the ionic conductivities activation energies of SDC and $(Li/Na)_2CO_3$ composite electrolytes decreased with increasing the relative amount of carbonate phase.

Figure 12:
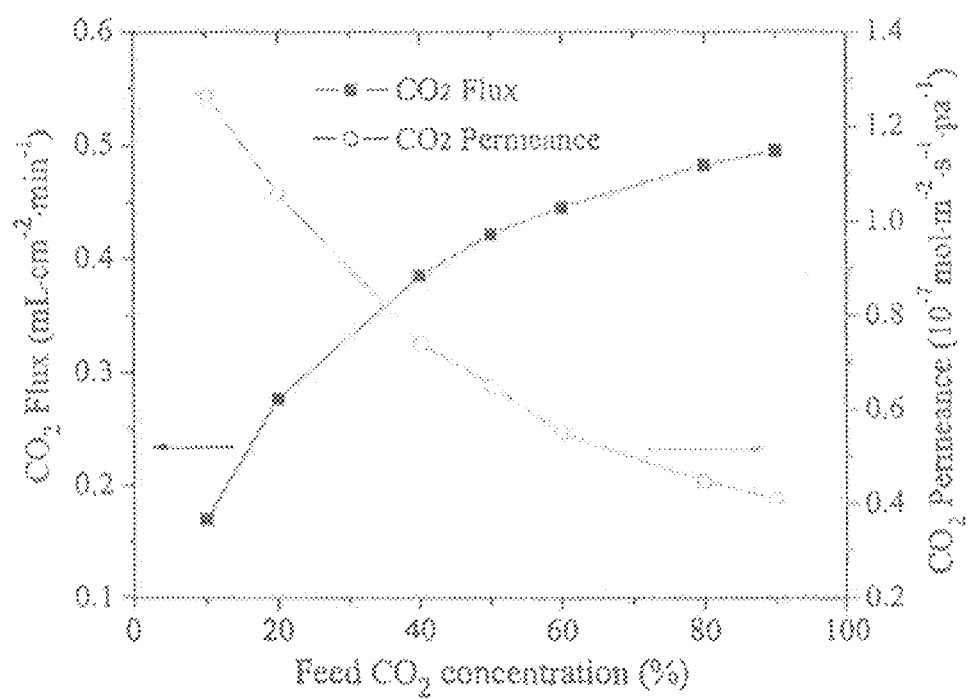
FIG. 12 is a graph showing $CO_2$ permeation flux and permeance of asymmetric tubular dual-phase membrane as a function of feed $CO_2$ concentration at 900° C.

$CO_2$ concentration in the feed side is also an important factor that affects the $CO_2$ permeation. As shown in FIG. 12, At 700° C. the $CO_2$ flux increases from 0.17 to 0.50 ml·cm$^{-2}$·min$^{-1}$ with increasing the feed $CO_2$ concentration from 10% to 90%, while the permeance decreases from 1.27×10$^{-7}$ to 0.41×10$^{-7}$ mol·m$^{-2}$·s$^{-1}$·Pa$^{-1}$. This result can be explained by the $CO_2$ permeation modeling. According to the modeling, $CO_2$ flux and permeance for the SDC-carbonate dual-phase membranes can be expressed as $$J_{CO_2} \propto [P'_{CO_2}{}^n - P''_{CO_2}{}^n] \quad (1)$$

and $$F_{CO_2} \propto [P'_{CO_2}{}^n - P''_{CO_2}{}^n]/[P'_{CO2} - P''_{CO2}] \quad (2)$$

wherein $J_{CO2}$ and $F_{CO2}$ are the $CO_2$ flux and permeance, respectively. The $P'_{CO2}$ is the $CO_2$ partial pressure in the feed side. As the $CO_2$ partial pressure increases from 0.1 to 0.9 atm, $CO_2$ flux is an increasing function, whereas $CO_2$ permeance is a decreasing function. For typical flue gas from coal-fired power plant, $CO_2$ concentration is 15-16%. For this feed $CO_2$ concentration, the $CO_2$ permeance is estimated to be 1.16×10$^{-7}$ mol·m$^{-2}$·s$^{-1}$·Pa$^{-1}$ at 700° C. Therefore, the dense dual-phase membrane is really promising for $CO_2$ capture from high temperature flue gas.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A tubular dual-phase membrane comprising:
    a tubular-shaped body comprising:
    an outer support layer comprising a first ceramic material that is non-wettable with carbonate;
    a thin inner layer bonded to the outer support layer made from a second ceramic material that is wettable with carbonate, wherein the second ceramic material is bonded to the carbonate; and
    a channel defined by the thin inner layer, wherein the channel is in communication with a proximal opening at a first end of the tubular body and a distal opening at a second end of the tubular body.

2. The tubular dual-phase membrane of claim 1, wherein the second ceramic material comprises a solid oxide electrolyte.

3. The tubular dual-phase membrane of claim 2, wherein the solid oxide electrolyte comprises samaria doped ceria (SDC).

4. The tubular dual-phase membrane of claim 1, wherein the first ceramic material comprises at least one of samaria doped ceria (SDC) and bismuth-yttria-samaria (BYS).

5. The tubular dual-phase membrane of claim 1, wherein the outer support layer has a thickness in a range of between 1 mm to 3 mm.

6. The tubular dual-phase membrane of claim 1, wherein the thin inner layer has a thickness in a range of between 1 to 150 μm.

7. A tubular dual-phase membrane comprising:
    a tubular-shaped body comprising:
    a solid porous ceramic phase made from a material that is non-wettable with carbonate and serves as an oxygen ion conductor;
    a molten carbonate phase made from a material that comprises carbonate; and
    a channel defined by the molten carbonate phase, wherein the channel is in communication with a proximal opening at a first end of the tubular-shaped body and a distal opening at a second end of the tubular-shaped body.

8. The tubular dual-phase membrane of claim 7, wherein the molten carbonate phase comprises a ceramic that is wettable with carbonate.

9. The tubular dual-phase membrane of claim 7, wherein the solid porous ceramic phase forms an outer support layer and the molten carbonate phase forms an inner layer of the tubular-shaped body.

10. A method for manufacturing a tubular dual-phase membrane comprising:
- spinning a first suspension in a centrifuge, wherein the first suspension comprises bismuth-yttria-samaria (BYS) poured into a container, wherein the BYS forms an outer layer after being spun in the centrifuge;
- spinning a second suspension in a centrifuge, wherein the second suspension comprises samaria doped ceria (SDC), wherein the SDC forms an inner layer that bonds with the outer layer to form a substantially tubular-shaped body after being spun in the centrifuge;
- removing the substantially tubular-shaped body from the container; and
- immersing the substantially tubular-shaped body in molten carbonite, wherein the molten carbonate is wettable with the inner layer and non-wettable with the outer layer such that the molten carbonate bonds with the inner layer.

11. The method of claim 10, further comprising:
sintering the substantially tubular-shaped body after the substantially tubular-shaped body is immersed in molten carbonate.

12. The method of claim 10, further comprising:
removing a liquid solvent after the step of spinning the first suspension in the centrifuge.

13. The method of claim 10, wherein the first suspension and the second suspension are spun in the centrifuge at substantially 4,000 rpm.

14. The method of claim 10, wherein the outer layer defines a channel after the first suspension is spun in the centrifuge.

15. The tubular dual-phase membrane of claim 1, wherein the first ceramic material comprises 55 wt % samaria doped ceria (SDC) and 45 wt % bismuth-yttria-samaria (BYS).

* * * * *